United States Patent [19]
Tsuchida et al.

[11] Patent Number: 5,985,954
[45] Date of Patent: Nov. 16, 1999

[54] EPOXY RESIN COMPOSITION FOR SEALING PHOTO-SEMICONDUCTOR ELEMENT AND PHOTO-SEMICONDUCTOR DEVICE SEALED WITH THE EPOXY RESIN COMPOSITION

[75] Inventors: Satoru Tsuchida, Makabe-gun; Masahiko Osaka, Shimodate, both of Japan

[73] Assignee: Htiachi Chemical Company, Ltd., Tokyo, Japan

[21] Appl. No.: 08/985,208

[22] Filed: Dec. 2, 1997

[51] Int. Cl.⁶ .............................. C08K 3/34; C08L 63/02
[52] U.S. Cl. .......................... 523/400; 257/431; 523/456; 523/466; 524/267; 528/88; 528/101
[58] Field of Search .................................. 523/400, 456, 523/466; 524/267; 528/88, 101; 257/431

[56] References Cited

FOREIGN PATENT DOCUMENTS 01185319   7/1989   Japan .

*Primary Examiner*—Robert A. Dawson
*Assistant Examiner*—D. Aylward
*Attorney, Agent, or Firm*—Antonelli, Terry, Stout & Kraus, LLP

[57] ABSTRACT

An epoxy resin composition for sealing a photo-semiconductor element, comprising
(A) an epoxy resin,
(B) a curing agent and
(C) a polyether-modified silicone oil which is represented by the following general formula (1)

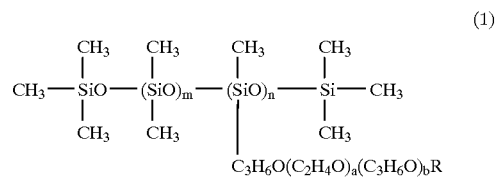

wherein m, n and a are each independently a number of 1 or more, b is 0 or a positive number, and R is an alkyl group of 1 to 6 carbon atoms or H,
and has a weight average molecular weight of 1,000 to 100,000, a silicone unit content $\{[(m+n+2)/(m+n+2+a+b+1)]\times 100\}$ of 10 to 60% and a polyether unit content $\{[(a+b+1)/(m+n+2+a+b+1)]\times 100\}$ of 40 to 90%
and a photo-semiconductor device produced by sealing a photo-semiconductor element with the epoxy resin composition.

19 Claims, 1 Drawing Sheet

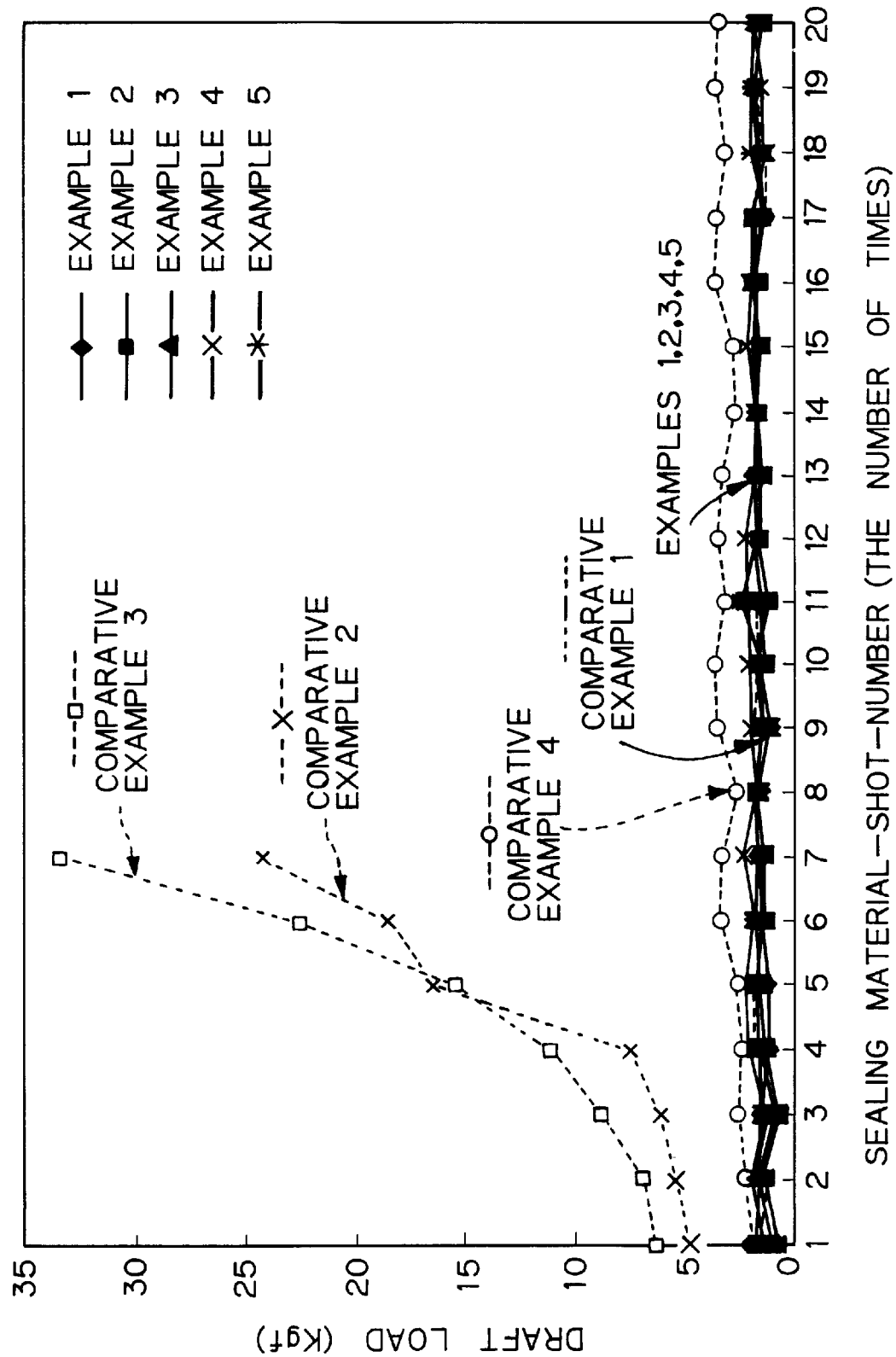

EPOXY RESIN COMPOSITION FOR SEALING PHOTO-SEMICONDUCTOR ELEMENT AND PHOTO-SEMICONDUCTOR DEVICE SEALED WITH THE EPOXY RESIN COMPOSITION

(a) FIELD OF THE INVENTION

The present invention relates to an epoxy resin composition for sealing photo-semiconductor elements, particularly to an epoxy resin composition which is excellent in releasability, adhesion to metals and light transmittance. The present invention also relates to a photo-semiconductor device sealed with the epoxy resin composition.

(b) DESCRIPTION OF THE RELATED ART

As resins for sealing light emitting diode and photo diode, epoxy resins containing acid anhydride curing agents have been mainly used because of their excellent transparency. Well-known methods of sealing with epoxy resins are casting or potting of liquid epoxy resins, and transfer molding of solid epoxy resins (being in powder or tablet form). Particularly, transfer molding is suitable for mass production enabling inexpensive production of photo-semiconductor devices, and it becomes the main current to seal photo-semiconductor elements by transfer molding.

One of the most important requisites of the sealing materials for photo-semiconductor elements is a high light transmittance, and internal mold release agents which do not lower transparency, namely ones having low molecular weights and being completely compatible with epoxy resins, have been used for the resins for sealing by transfer molding. Moldings of sealing materials containing such internal mold release agents have high light transmittance but little releasability. Thus, the molds are generally coated with silicone or fluorine-containing external mold release agents prior to transfer molding. These external mold release agents permeate into the sealing materials, and make them turbid or cause formation of voids. Even the molds coated with the external mold release agents cannot enable continuous molding, because the sealing materials having little releasability need the molds coated with the external mold release agents every third to fifth shot. This troublesome treatment considerably decreases the productivity of transfer molding. In addition, external mold release agents cause environmental, safety and sanitary problems because almost all of them need gaseous organic solvents.

Also several reports have appeared on internal mold release agents which effectively improve the releasability of sealing materials, for example, in Japanese Patent Application Unexamined Publication No. 6-157817 (1994) is proposed the use of aliphatic ester compounds of up to 25 carbon atoms as internal mold release agents. When used as internal mold release agents, these compounds improve releasability while keeping transparency, but decrease the adhesion of sealing materials to tips, metal frames, etc. and make it difficult to ensure reliability, such as moisture resistance. The effectiveness of the long chain aliphatic (di)ester compounds in improving transparency and releasability owes to their controlled molecular weight. The sealing materials containing such compounds, however, hardly adhere to metals, such as aluminum, and allow moisture to enter through the interfaces between packages and lead frames. Further, the melt viscosity of the sealing materials tend to be decreased considerably during transfer molding, thereby increasing the possibility of the formation of voids.

Various silicone oils marketed as mold release agents are unsuitable for epoxy resins, because they are completely incompatible with epoxy resins. That is, epoxy resin compositions containing these silicone oils as mold release agents get cloudy on curing, and cannot be released from molds after transfer molding.

SUMMARY OF THE INVENTION

The present invention has been made in consideration of such circumstances, and an object of the present invention is to provide a resin composition for sealing photo-semiconductor elements which is excellent in transparency, releasability and adhesion to various base materials. Another object of the present invention is to provide a photo-semiconductor device which is sealed with the resin composition.

We have studied various modified silicone oils to solve the above-described problems and have recovered that sealing materials being excellent in releasability, transparency and adhesion to metals are obtainable by mixing specific polyether-modified silicone oils into epoxy resin molding materials. Based on this recovery, we have completed the present invention.

That is, the present invention provides an epoxy resin composition for sealing a photo-semiconductor element, comprising (A) an epoxy resin, (B) a curing agent and (C) a polyether-modified silicone oil which is represented by the following general formula (1)

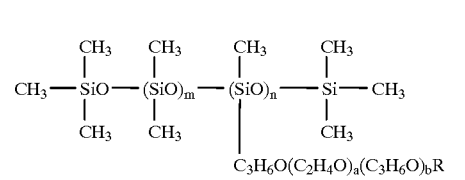

wherein m, n and a are each independently a number of 1 or more, b is 0 or a positive number, and R is an alkyl group of 1 to 6 carbon atoms or H, and has a weight average molecular weight of 1,000 to 100,000, a silicone unit content $\{[(m+n+2)/(m+n+2+a+b+1)]\times 100\}$ of 10 to 60% and a polyether unit content $\{[(a+b+1)/(m+n+2+a+b+1)]\times 100\}$ of 40 to 90%.

The mechanism of the excellent effects of the polyether-modified silicone oil used in the present invention is not clarified, but it is presumed that the silicone oil, because of its surface activating effects, exhibits transparency by the dissolution of the polyether part with epoxy resins, and improves releasability by the orientation of the silicone part on mold surfaces.

The present invention also provides a photo-semiconductor device produced by sealing a photo-semiconductor element with the epoxy resin composition for sealing photo-semiconductor elements.

BRIEF DESCRIPTION OF THE DRAWING

FIG. 1 is a graph showing the continuous releasability of the epoxy resin compositions prepared in Examples and Comparative Examples.

DESCRIPTION OF THE PREFERRED EMBODIMENTS

Epoxy resins which may be used in the present invention are not limited so far as they have two or more epoxy groups per molecule and are useful as epoxy resin molding materials, and typical examples are epoxidation products of novolac resins produced from phenols and aldehydes, such as phenol novolac epoxy resin and ortho-cresol novolac epoxy resin; diglycidyl ether epoxy resins, for example, the reaction products of dihydric phenols, such as bisphenol A, bisphenol F, bisphenol S or hydrogenated bisphenol A, with epichlorohydrin; glycidyl ester epoxy resins, which are the reaction products of polybasic acids, such as phthalic acid or dimer acids, with epichlorohydrin; glycidylamine epoxy resins, which are the reaction products of polyamines, such as diaminodiphenylmethane or isocyanuric acid, with epichlorohydrin; and linear aliphatic epoxy resins and alicyclic epoxy resins which are obtainable by oxidizing olefin bonds with per acids, such as peracetic acid; and these may be used individually or, according to demands, in combination of two or more. Epoxy resins are preferably purified sufficiently, and it is desirable to use, as far as possible, those being colorless and transparent in liquid state.

Curing agents which may be used in combination with the epoxy resins are not limited so far as the epoxy resins can be cured with them, and may be known curing agents. In consideration of suitability for transfer molding, phenolic resins and acid anhydrides are preferable. Particularly preferred are acid anhydrides, which remarkably improve the optical properties of cured products.

Examples of acid anhydrides usable as curing agents are colorless or light-yellow acid anhydrides, such as hexahydrophthalic anhydride, tetrahydrophthalic anhydride, methylhexahydrophthalic anhydride and methyltetrahydrophthalic anhydride. Acid anhydrides may be used individually or in combination of two or more.

The ratio of epoxy resins to acid anhydride curing agents is such that the ratio of the number of the epoxy groups of epoxy resins to the number of the acid anhydride groups of acid anhydrides (epoxy groups/acid anhydride groups) ranges preferably 0.7–1.3, more preferably 0.9–1.1.

Examples of the phenolic resins usable as curing agents include phenol novolac resins, cresol novolac resins, dicyclopentadiene-modified phenolic resins, terpene-modified phenolic resins and triphenolmethane compounds. Phenolic resins may be used individually or in combination of two or more.

The ratio of epoxy resins to phenolic resin curing agents is such that the ratio of the number of the epoxy groups of epoxy resins to the number of the phenolic hydroxyl groups of phenolic resins (epoxy groups/phenolic hydroxyl groups) ranges preferably 0.7–1.3, more preferably 0.9–1.1.

The epoxy resin composition of the present invention may contain cure accelerators, according to demands. Examples of usable cure accelerators include tertiary amines, such as 1,8-diazabicyclo(5.4.0)undecene-7, triethylenediamine, benzyldimethylamine, triethanolamine and tris(dimethylaminomethyl)phenol, imidazoles, such as 2-methylimidazole, 2-phenylimidazole, 2-phenyl-4-methylimidazole and 1-benzyl-2-phenylimidazole, organic phosphines, such as tributylphosphine, triphenylphosphine and diphenylphosphine, tetraphenylborates, such as tetraphenylphosphonium tetraphenylborate, triphenylphosphine tetraphenylborate and 2-ethyl-4-methylimidazole tetraphenylborate. Cure accelerators may be used individually or in combination of two or more.

The proportion of cure accelerators is preferably 0.1 to 5% by weight, more preferably 0.5 to 3% by weight, based on the total of epoxy resins and curing agents.

The polyether-modified silicone oil used in the present invention as an internal release agent is represented by the general formula (1) and has a weight average molecular weight (as measured by a GPC method using toluene solvent) of 1,000 to 100,000, preferably 2,000 to 20,000. If the weight average molecular weight is less than 1,000, the releasability of the epoxy resin composition will be lowered, and if it is more than 100,000, dispersibility in resins will be lowered, and the transparency of the epoxy resin composition will be decreased.

The polyether-modified silicone oil has a silicone unit content $\{[(m+n+2)/(m+n+2+a+b+1)]\times 100\}$ of 10 to 60%, preferably 20 to 40%, and a polyether unit content $\{[(a+b+1)/(m+n+2+a+b+1)]\times 100\}$ of 40 to 90%, preferably 60 to 80%. If the silicone unit content is less than 10%, the releasability of the epoxy resin composition will be lowered, and if it is more than 60%, the transparency of the epoxy resin composition will be decreased.

"m", "n" and "a" in the general formula (1) are each respectively a number of 1 or more, and "b" is 0 or a positive number, and these numbers are such that the polyether-modified silicone oil has a weight average molecular weight of 1,000 to 100,000, a silicone unit content of 10 to 60% and a polyether unit content of 40 to 90%. Generally, m is preferably a number of 10 to 500, n is preferably a number of 1 to 20, a is preferably a number of 1 to 50, and b is preferably a number of 0 to 50.

The values of m, n, a and b are calculated from the $\Delta$-values of $^1$H-NMR measured by NMR (nuclear magnetic resonance) method.

R is an alkyl group of 1 to 6 carbon atoms, preferably 1 to 3 carbon atoms, or H.

The polyether-modified silicone oils represented by the general formula (1) may be used individually or in combination of two or more.

The proportion of the polyether-modified silicone oils represented by the general formula (1) is preferably 0.01 to 10% by weight, more preferably 0.1 to 5% by weight, based on the total of epoxy resins, curing agents and the polyether-modified silicone oils. If it is less than 0.01% by weight, mold release at the time of molding may become difficult, and if it is more than 10% by weight, the transparency and reliability of sealed photo-semiconductor devices may be adversely affected.

Among polyether-modified silicone oils satisfying the above conditions, polyether-modified silicone oils having a HLB value (hydrophilic-lipophilic balance: indicating the strength of surface activating functions) of 10 to 20 improve more effectively the transparency and adhesion of the photo-semiconductor devices sealed with the epoxy resin molding composition of the present invention.

The epoxy resin composition of the present invention may contain, in addition to the above components, conventional additives, such as antioxidants, colorants, coupling agents, modifying agents, light (UV light, visible light, infrared ray) absorbers, agents for decreasing stress and fillers, according to demands. Other mold release agents may also be used so far as the effects of the present invention are not adversely affected.

The photo-semiconductor device of the present invention is produced by sealing a photo-semiconductor element by using the epoxy resin composition of the present invention as a sealing material.

Examples of photo-semiconductor elements suitable for the present invention are light emitting diode, photo diode and composite devices, and photo-semiconductor devices are produced by sealing these photo-semiconductor elements with the epoxy resin composition of the present invention.

Examples of the photo-semiconductor devices include LED, photo couplers, photo pick up, display devices for portable communication apparatuses and display panels.

Various sealing methods can be employed, for example, casting, potting and transfer molding. Transfer molding is particularly desirable because of its suitability for mass production.

When photo-semiconductor elements are sealed by transfer molding using the epoxy resin composition of the present invention, molding is carried out preferably at a molding temperature of 140 to 160° C., at a pressure of 40 to 120 kgf/cm$^2$, for a molding time of 1 to 5 minutes, followed preferably by after curing at 120 to 160° C. for 1 to 12 hours.

Hereinafter, the present invention will be described in detail referring to examples and comparative examples, which, however, do not limit the scope of the present invention.

The methods of the tests carried out in examples and comparative examples are described below.

(1) Light Transmittance

The transmittance of a light of 600 nm wave length through a sample of 1 mm thick was measured by using a spectrophotometer (U-2000 Model, produced by Hitachi, Ltd.).

(2) Aluminum Peeling Strength

Each sealing material was molded in a mold lined with a mirror-finished aluminum foil, and the peeling strength (adhesion strength) between the sealing material and the aluminum foil was measured by peeling the aluminum foil from the obtained molding at a rate of 30 mm/min by using an autograph (AGS-500A Model, produced by Kabushiki Kaisha Shimazu Seisakusho).

(3) Releasability

Each sealing material was transfer molded by using a mold for forming tapered moldings of diameters of 9 φmm (upper surface) and 10 φmm (lower surface) and 20 mm in height, and the resulting tapered molding was removed from the mold immediately to measure draft load (the load required to remove moldings from molds) with a push gauge. Before the test of each sample for measuring draft load, a release recovery material for photo-semiconductor (Trade name: CEL-T-R100, produced by Hitachi Chemical Company, Ltd.) was molded one shot.

(4) Continuous Releasability

The above molding procedure for testing releasability was repeated 20 shots continuously, and the measurements of draft load was carried out every shot.

EXAMPLES 1 TO 5 AND COMPARATIVE EXAMPLES 1 TO 4

The components as listed in Tables 1 to 3 were kneaded in a kneader (barrel temperature: 90° C.), cooled and ground, to obtain powdery epoxy resin compositions. These epoxy resin compositions were transfer molded by using the molds for the above-described tests at a molding temperature of 150° C. (pressure: 45 kgf/cm$^2$, time: 3 minutes), and then after cured at 150° C. for four hours.

The results of the tests for light transmittance, aluminum peeling strength and releasability are shown in Table 4, and the results of the test for continuous releasability are shown in Table 5 and FIG. 1.

TABLE 1

| | | Example Nos. (part by weight) | | | | |
|---|---|---|---|---|---|---|
| | | 1 | 2 | 3 | 4 | 5 |
| Difunctional epoxy resin *1 | | 80 | 80 | 80 | 80 | 80 |
| Trifunctional epoxy resin *2 | | 20 | 20 | 20 | 20 | 20 |
| Acid anhydride curing agent *3 | | 38 | 38 | 38 | 38 | 38 |
| Cure accelerator *4 | | 2.5 | 2.5 | 2.5 | 2.5 | 2.5 |
| Mold release agent | Kind | a | b | c | d | a  b |
| | Amount | 2.0 | 2.0 | 2.0 | 2.0 | 1.5  0.5 |

*1: Trade name: EPOMIC R366, a bisphenol A-type epoxy resin, epoxy equivalent weight: 994, produced by Mitsui Petrochemical Industries, Ltd.
*2: Trade name: TEPIC-S, a trifunctional epoxy resin (triglycidyl isocyanurate), epoxy equivalent weight: 100, produced by Nissan Chemical Industries, Ltd.
*3: Trade name: RIKACID TH, tetrahydrophthalic anhydride, acid anhydride group equivalent weight: 152, produced by Shin-Nippon Rika Co., Ltd.
*4: Trade name: 1B2PZ, 1-benzyl-2-phenylimidazole, produced by Shikoku Kasei Co., Ltd.

TABLE 2

| | | Comparative Example Nos. (part by weight) | | | |
|---|---|---|---|---|---|
| | | 1 | 2 | 3 | 4 |
| Difunctional epoxy resin *1 | | 80 | 80 | 80 | 80 |
| Trifunctional epoxy resin *2 | | 20 | 20 | 20 | 20 |
| Acid anhydride curing agent *3 | | 38 | 38 | 38 | 38 |
| Cure accelerator *4 | | 2.5 | 2.5 | 2.5 | 2.5 |
| Mold release agent | Kind | e | f | g | h |
| | Amount | 2.0 | 2.0 | 3.0 | 2.0 |

*1: Trade name: EPOMIC R366, a bisphenol A-type epoxy resin, epoxy equivalent weight: 994, produced by Mitsui Petrochemical Industries, Ltd.
*2: Trade name: TEPIC-S, a trifunctional epoxy resin (triglycidyl isocyanurate), epoxy equivalent weight: 100, produced by Nissan Chemical Industries, Ltd.
*3: Trade name: RIKACID TH, tetrahydrophthalic anhydride, acid anhydride group equivalent weight: 152, produced by Shin-Nippon Rika Co., Ltd.
*4: Trade name: 1B2PZ, 1-benzyl-2-phenylimidazole, produced by Shikoku Kasei Co., Ltd.

TABLE 3

| Mold release agent | Polyether-modified silicone oil represented by general formula (1) | | | |
|---|---|---|---|---|
| | Weight average molecular weight | Silicone unit content (%) | Polyether unit content (%) | HLB |
| a | 4,000 | 50 | 50 | 10 |
| b | 11,000 | 20 | 80 | 11 |
| c | 4,000 | 30 | 70 | 15 |
| d | 20,000 | 10 | 90 | 18 |
| e | 3,000 | 65 | 35 | 5 |
| f | 800 | 30 | 70 | 11 |
| g | Stearic acid | | | |
| h | Behenic bisamide | | | |

TABLE 4

| | Light transmittance (%) | Aluminum peeling strength (g/cm) | Releasability (kgf) |
|---|---|---|---|
| Example Nos. | | | |
| 1 | 88 | 220 | 1.8 |
| 2 | 91 | 200 | 1.1 |
| 3 | 90 | 250 | 0.8 |

TABLE 4-continued

| | Light transmittance (%) | Aluminum peeling strength (g/cm) | Releasability (kgf) |
|---|---|---|---|
| 4 | 91 | 220 | 1.8 |
| 5 | 90 | 230 | 1.4 |
| Comparative Example Nos. | | | |
| 1 | 0 | 240 | 1.5 |
| 2 | 91 | 220 | 4.8 |
| 3 | 90 | 250 | 6.4 |
| 4 | 85 | 0 | 1.9 |

TABLE 5

| Sealing material-shot-number | Draft load (kgf) | | | | | | | | |
|---|---|---|---|---|---|---|---|---|---|
| | Example Nos. | | | | | Comparative Example Nos. | | | |
| | 1 | 2 | 3 | 4 | 5 | 1 | 2 | 3 | 4 |
| 1 | 1.8 | 1.1 | 0.8 | 1.8 | 1.4 | 1.5 | 4.8 | 6.4 | 1.9 |
| 2 | 1.5 | 1.6 | 1.4 | 1.7 | 1.9 | 1.4 | 5.5 | 6.9 | 2.2 |
| 3 | 1.6 | 0.9 | 0.7 | 1.3 | 1.5 | 1.6 | 6.1 | 8.9 | 2.5 |
| 4 | 1.1 | 1.5 | 1.3 | 2.1 | 1.7 | 1.7 | 7.5 | 11.2 | 2.3 |
| 5 | 1.2 | 1.8 | 1.6 | 2.2 | 1.6 | 1.8 | 16.5 | 15.4 | 2.6 |
| 6 | 1.5 | 1.3 | 1.5 | 1.9 | 1.8 | 1.6 | 18.5 | 22.6 | 3.4 |
| 7 | 1.7 | 1.4 | 1.4 | 2.4 | 1.7 | 1.8 | 24.3 | 33.5 | 3.3 |
| 8 | 1.8 | 1.8 | 1.7 | 1.7 | 1.6 | 1.4 | | | 2.6 |
| 9 | 1.1 | 1.4 | 1.6 | 2 | | 1.1 | 1.8 | | 3.5 |
| 10 | 1.5 | 1.8 | 1.3 | 2.1 | 1.5 | 1.6 | | | 3.7 |
| 11 | 1.6 | 1.1 | 1.5 | 2.2 | 2.4 | 1.8 | | | 3.1 |
| 12 | 1.7 | 1.6 | 1.8 | 2.2 | 1.6 | 1.4 | | | 3.5 |
| 13 | 1.8 | 1.6 | 1.4 | 1.8 | 1.4 | 1.6 | | | 3.3 |
| 14 | 1.6 | 1.6 | 1.6 | 1.7 | 1.7 | 1.6 | | | 2.6 |
| 15 | 1.5 | 1.5 | 1.8 | 2.1 | 1.6 | 1.5 | | | 2.7 |
| 16 | 1.7 | 1.8 | 1.6 | 1.9 | 1.8 | 1.8 | | | 3.6 |
| 17 | 1.3 | 1.9 | 1.7 | 1.8 | 1.4 | 1.2 | | | 3.5 |
| 18 | 1.5 | 1.4 | 1.6 | 1.3 | 1.9 | 1.2 | | | 3.1 |
| 19 | 1.6 | 1.8 | 1.8 | 1.4 | 1.9 | 1.7 | | | 3.5 |
| 20 | 1.8 | 1.3 | 1.6 | 1.7 | 1.7 | 1.6 | | | 3.4 |

The above results show that the sealing materials of Examples 1–5 have excellent transparency, and, in spite of their high adhesion strength to metal, are also excellent in releasability and can be molded continuously.

On the other hand, the sealing material of Comparative Example 1, due to the excessive silicone unit content in the polyether-modified silicone oil, has excellent releasability but is so cloudy as to permeate no light.

the sealing material of Comparative Example 2, wherein each molecule of polyether-modified silicone oil is completely mixed with the epoxy resin due to the low molecular weight of the polyether-modified silicone oil, exhibits high light transmittance but is inferior in relesability and cannot be molded continuously.

As Comparative Example 2, the sealing material of comparative Example 3 is considerably inferior in releasability because the mold release agent is completely mixed with the epoxy resin.

The sealing material of Comparative Example 4 is excellent in light transmittance and releasability but are not reliable in moisture resistance and heat cycle resistance due to complete lack of adhesion to metals.

According to the present invention, photo-semiconductor devices of high reliability can be produced with low production cost because the photo-semiconductor elements can be sealed continuously with epoxy resin compositions which are excellent in transparency and releasability and adhere strongly to metal.

What is claimed is:

1. An epoxy resin composition for sealing a photo-semiconductor element, comprising
   (A) an epoxy resin,
   (B) a curing agent and
   (C) a polyether-modified silicone oil which is represented by the following general formula (1)

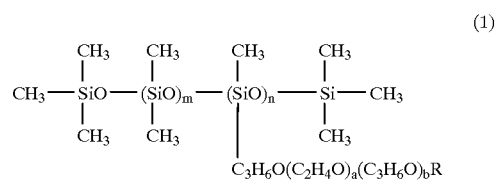

wherein m, n and a are each independently a number of 1 or more, b is 0 or a positive number, and R is an alkyl group of 1 to 6 carbon atoms or H,
   and has a weight average molecular weight of 1,000 to 100,000, a silicone unit content $\{[(m+n+2)/(m+n+2+a+b+1)]\times 100\}$ of 10 to 60% and a polyether unit content $\{[(a+b+1)/(m+n+2+a+b+1)]\times 100\}$ or 40 to 90%.

2. The epoxy resin composition of claim 1, which contains 0.01 to 10% by weight of the polyether-modified silicone oil based on a total of the epoxy resin, the curing agent and the polyether-modified silicone oil.

3. The epoxy resin composition of claim 1, wherein the epoxy resin is selected from the group consisting of an epoxidation product of a novolac resin, a diglycidyl ether epoxy resin which is a reaction product of a dihydric phenol with epichlorohydrin, a glycidyl ester epoxy resin which is a reaction product of a polybasic acid with epichlorohydrin, a glycidylamine epoxy resin which is a reaction product of a polyamine with epichlorohydrin, a linear aliphatic epoxy resin and an alicyclic epoxy resin, and wherein the curing agent is an acid anhydride curing agent.

4. The epoxy resin composition of claim 3, wherein epoxy groups of the epoxy resin and acid anhydride groups of the acid anhydride curing agent are in a ratio of number, epoxy groups/acid anhydride groups, of 0.7 to 1.3.

5. The epoxy resin composition of claim 3, wherein the acid anhydride curing agent is selected from the group consisting of hexahydrophthalic anhydride, tetrahydrophthalic anhydride, methylhexahydrophthalic anhydride and methyltetrahydrophthalic anhydride.

6. The epoxy resin composition of claim 3, wherein the epoxy resin is a mixture of a diglycidyl ether epoxy resin and triglycidyl isocyanurate, and wherein the acid anhydride curing agent is tetrahydrophthalic anhydride.

7. The epoxy resin composition of claim 1, wherein the epoxy resin is selected from the group consisting of an epoxidation product of a novolac resin, a diglycidyl ether epoxy resin which is a reaction product of a dihydric phenol with epichlorohydrin, a glycidyl ester epoxy resin which is a reaction product of a polybasic acid with epichlorohydrin, a glycidylamine epoxy resin which is a reaction product of a polyamine with epichlorohydrin, a linear aliphatic epoxy resin and an alicyclic epoxy resin, and wherein the curing agent is a phenolic resin curing agent.

8. The epoxy resin composition of claim 7, wherein epoxy groups of the epoxy resin and phenolic hydroxyl groups of the phenolic resin curing agent are in a ratio of number, epoxy groups/phenolic hydroxyl groups, of 0.7 to 1.3.

9. The epoxy resin composition of claim 7, wherein the phenolic resin curing agent is selected from the group consisting of a phenol novolac resin, a cresol novolac resin, a dicyclopentadiene-modified phenolic resin, a terpene-modified phenolic resin and triphenolmethane compound.

10. The epoxy resin composition of claim 1, which further comprises a cure accelerator selected from the group consisting of a tertiary amine, an imidazole, an organic phosphine and a tetraphenylborate.

11. The epoxy resin composition of claim 10, wherein the cure accelerator is 0,1 to 5% by weight based on a total of the epoxy resin and the curing agent.

12. The epoxy resin composition of claim 10, wherein the epoxy resin is selected from the group consisting of an epoxidation product of a novolac resin, a diglycidyl ether epoxy resin which is a reaction product of a dihydric phenol with epichlorohydrin, a glycidyl ester epoxy resin which is a reaction product of a polybasic acid with epichlorohydrin, a glycidylamine epoxy resin which is a reaction product of a polyamine with epichlorohydrin, a linear aliphatic epoxy resin and an alicyclic epoxy resin, and wherein the curing agent is an acid anhydride curing agent.

13. The epoxy resin composition of claim 12, wherein epoxy groups of the epoxy resin and acid anhydride groups of the acid anhydride curing agent are in a ratio of number, epoxy groups/acid anhydride groups, of 0.7 to 1.3.

14. The epoxy resin composition of claim 12, wherein the acid anhydride curing agent is selected from the group consisting of hexahydrophthalic anhydride, tetrahydrophthalic anhydride, methylhexahydrophthalic anhydride and methyltetrahydrophthalic anhydride.

15. The epoxy resin composition of claim 12, wherein the epoxy resin is a mixture of a diglycidyl ether epoxy resin and triglycidyl isocyanurate, the acid anhydride curing agent is tetrahydrophthalic anhydride, and the cure accelerator is 1-benzyl-2-phenylimidazole.

16. The epoxy resin composition of claim 10, wherein the epoxy resin is selected from the group consisting of an epoxidation product of a novolac resin, a diglycidyl ether epoxy resin which is a reaction product of a dihydric phenol with epichlorohydrin, a glycidyl ester epoxy resin which is a reaction product of a polybasic acid with epichlorohydrin, a glycidylamine epoxy resin which is a reaction product of a polyamine with epichlorohydrin, a linear aliphatic epoxy resin and an alicyclic epoxy resin, and wherein the curing agent is a phenolic resin curing agent.

17. The epoxy resin composition of claim 16, wherein epoxy groups of the epoxy resin and phenolic hydroxyl groups of the phenolic resin curing agent are in a ratio of number, epoxy groups/phenolic hydroxyl groups, of 0.7 to 1.3.

18. The epoxy resin composition of claim 16, wherein the phenolic resin curing agent is selected from the group consisting of a phenol novolac resin, a cresol novolac resin, a dicyclopentadiene-modified phenolic resin, a terpene-modified phenolic resin and triphenolmethane compound.

19. A photo-semiconductor device produced by sealing a photo-semiconductor element with the epoxy resin composition of claim 1.

* * * * *

UNITED STATES PATENT AND TRADEMARK OFFICE
CERTIFICATE OF CORRECTION

PATENT NO.   : 5,985,954
DATED        : November 16, 1999
INVENTOR(S)  : Tsuchida, et al.

It is certified that error appears in the above-identified patent and that said Letters Patent is hereby corrected as shown below:

On the title page,

After Item No. [22], insert the following Item No.

--[30]   Foreign Application Priority Data

December 3, 1996   [JP] .................. 8-322417--.

Signed and Sealed this

Twenty-seventh Day of March, 2001

Attest:

NICHOLAS P. GODICI

*Attesting Officer*     *Acting Director of the United States Patent and Trademark Office*